United States Patent
Monsef et al.

[11] Patent Number: 5,957,717
[45] Date of Patent: Sep. 28, 1999

[54] RANGE POLE WITH INTEGRATED POWER SYSTEM

[75] Inventors: Eric Monsef, San Jose; Christopher Hankins, Santa Clara, both of Calif.

[73] Assignee: Trimble Navigation Limited, Sunnyvale, Calif.

[21] Appl. No.: 08/757,948

[22] Filed: Nov. 26, 1996

[51] Int. Cl.$^6$ .................................................. G01C 15/02
[52] U.S. Cl. ........................... 439/339; 33/293; 439/700; 439/920
[58] Field of Search .............................. 33/290, 293–296, 33/299; 439/500, 920, 700, 824, 339; 429/96, 99, 123, 151, 157

[56] References Cited

U.S. PATENT DOCUMENTS

| | | | |
|---|---|---|---|
| 431,412 | 7/1890 | Studte | 439/700 |
| 2,915,618 | 12/1959 | Rongaus | 33/293 |
| 5,031,328 | 7/1991 | Bhaumik | 33/293 |
| 5,067,906 | 11/1991 | Woodgate | 439/675 |

*Primary Examiner*—Neil Abrams
*Attorney, Agent, or Firm*—Patrick T. King

[57] ABSTRACT

A range pole and in-line detachable battery module assembly including a range pole (10) with an elongated tubular graphite-epoxy range pole shell (102) which has a female cap assembly (108) and a male cap assembly (26) at opposite ends. The male cap assembly (26) includes a central bore (30) formed therethrough for containing an insulator plug (32) to which are attached coaxial electrical contacts (132, 134). The coaxial electrical contacts include a first contact surface surrounded by a second concentric contact surface. The male cap assembly includes an externally threaded stud (28) having a central bore (30) formed therethrough for containing an insulator plug (32) to which are attached pin sockets (67, 68) which contain spring-loaded male pin electrical contacts (34, 36). A detachable battery module (12) includes a tubular battery-module shell (24) which has a male cap (26) at one end. The male cap assembly also includes an externally threaded portion having a central bore formed therein for containing an insulator plug to which are attached sockets which contain spring-loaded male pin electrical contacts. A detachable tip (14) includes a ribbed aluminum tip body (150) having external ribs (152) formed in the sides thereof and a stainless steel tip (160). To assemble the battery module (12) to the range pole (10), the male cap assembly (26) of the battery module is threadedly joined to the female cap assembly (108) to cause pin contacts (34, 36) to become engaged to coaxial contacts (132, 134). The male cap assembly (26) at the other end of the range pole (10) is to be used for connection to other equipment.

22 Claims, 9 Drawing Sheets

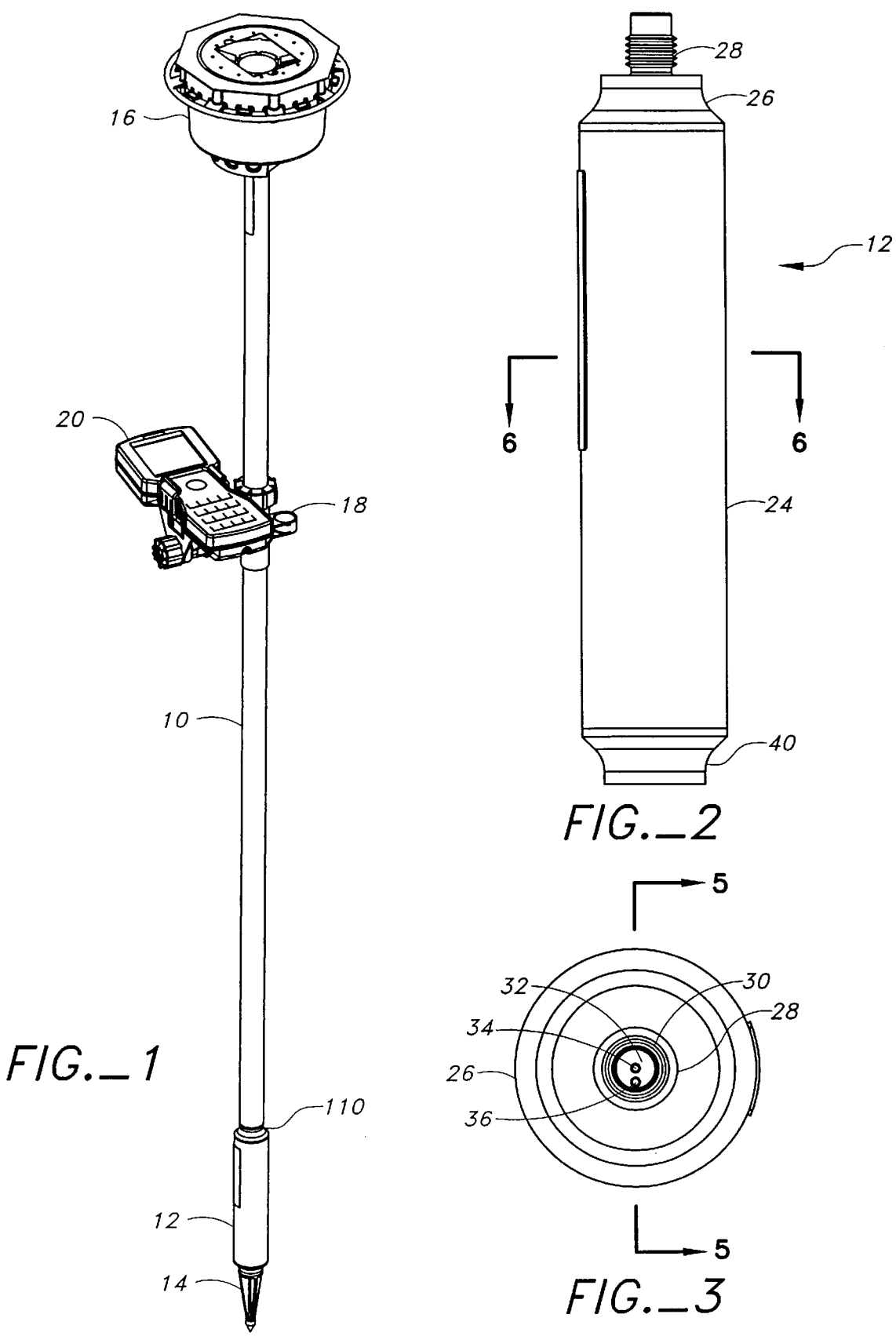

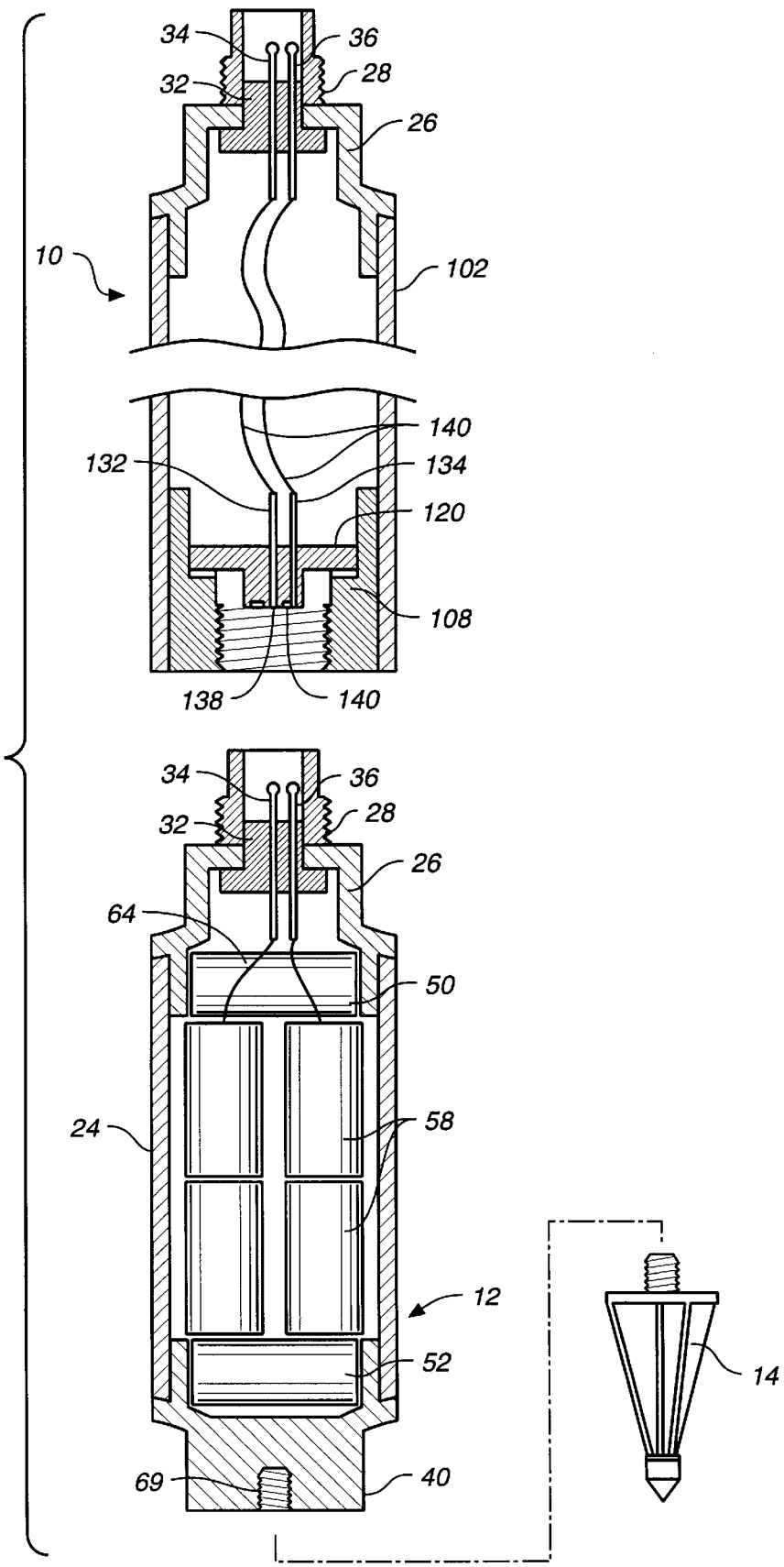

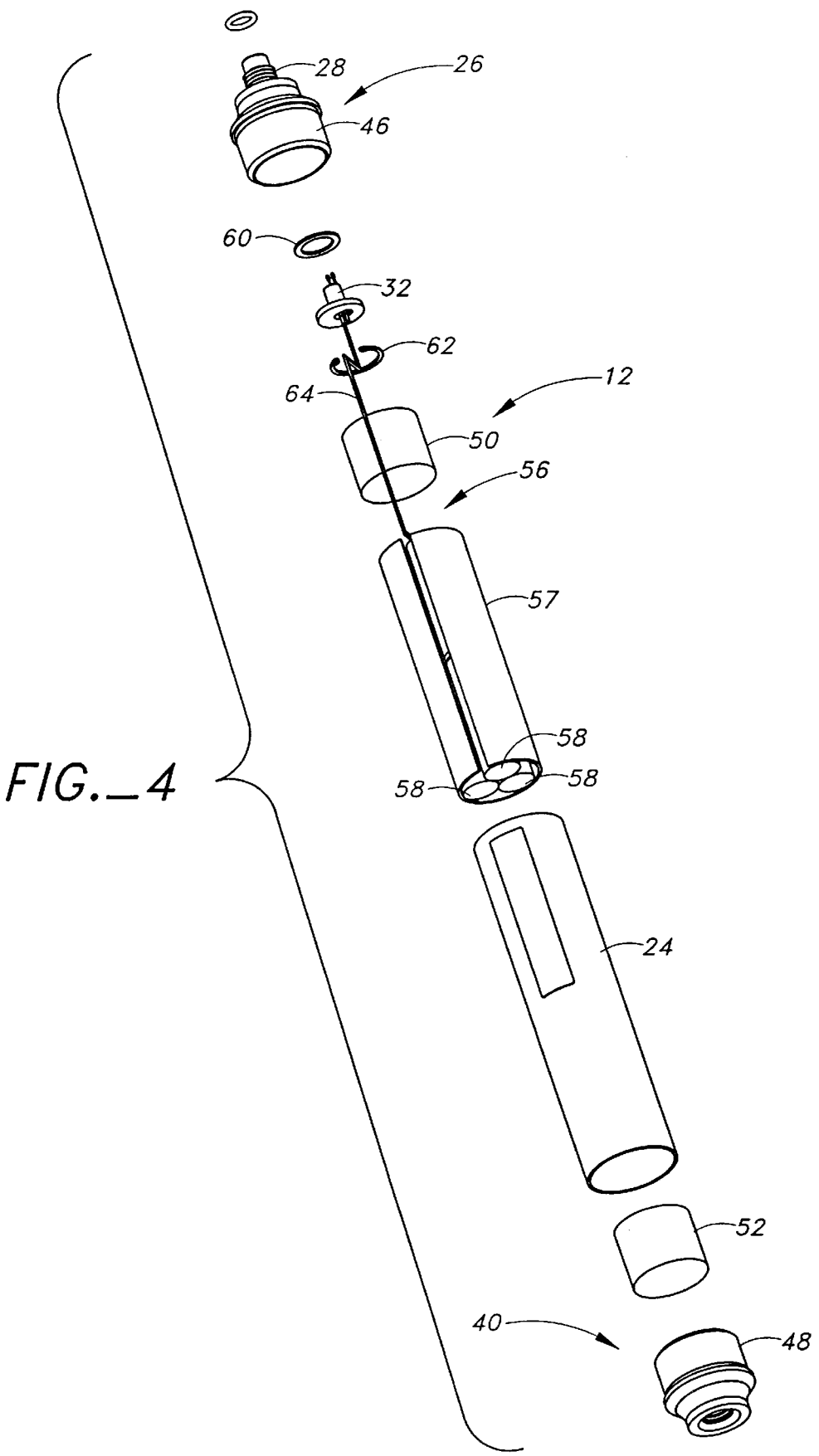
FIG._4

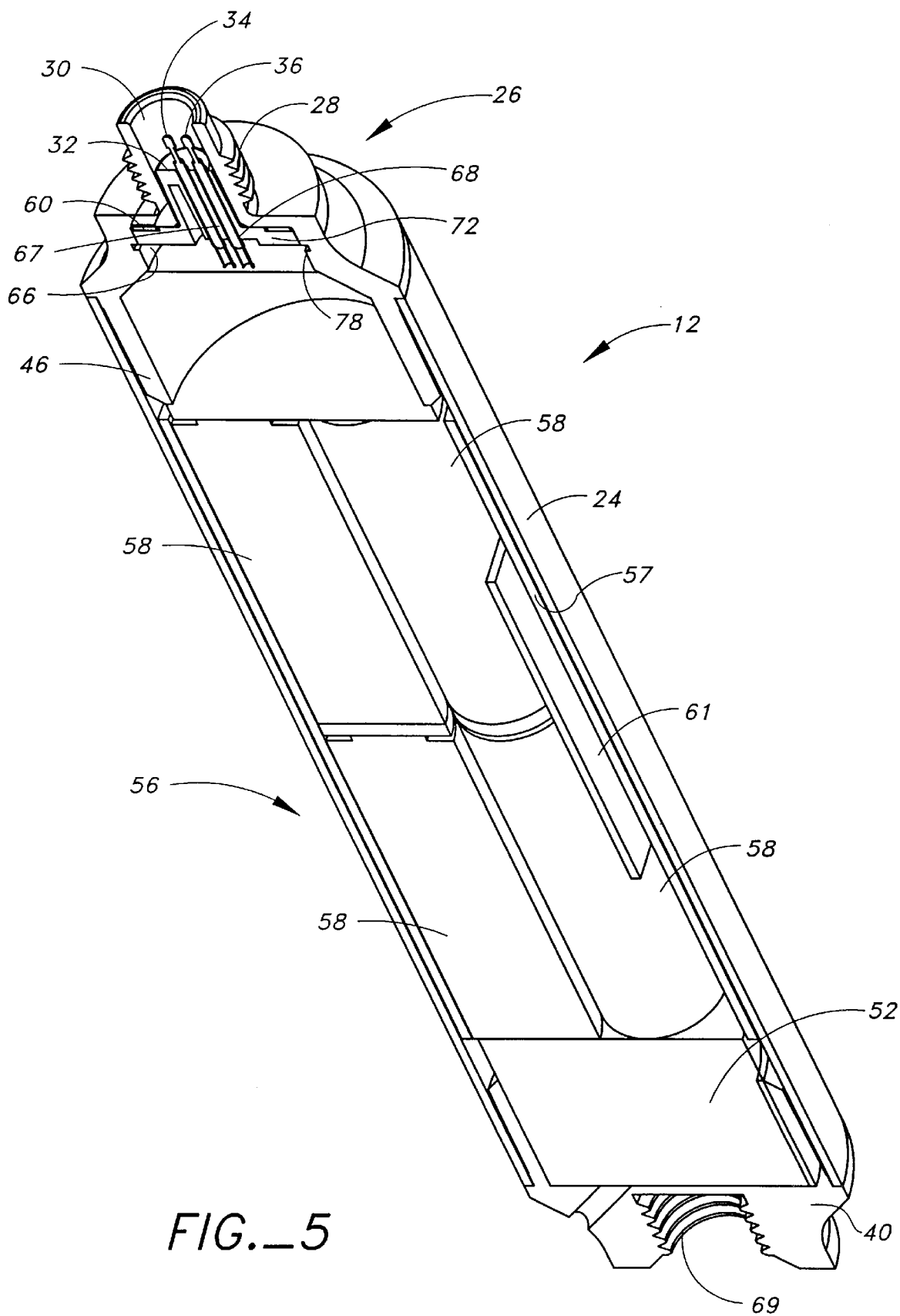
FIG._5

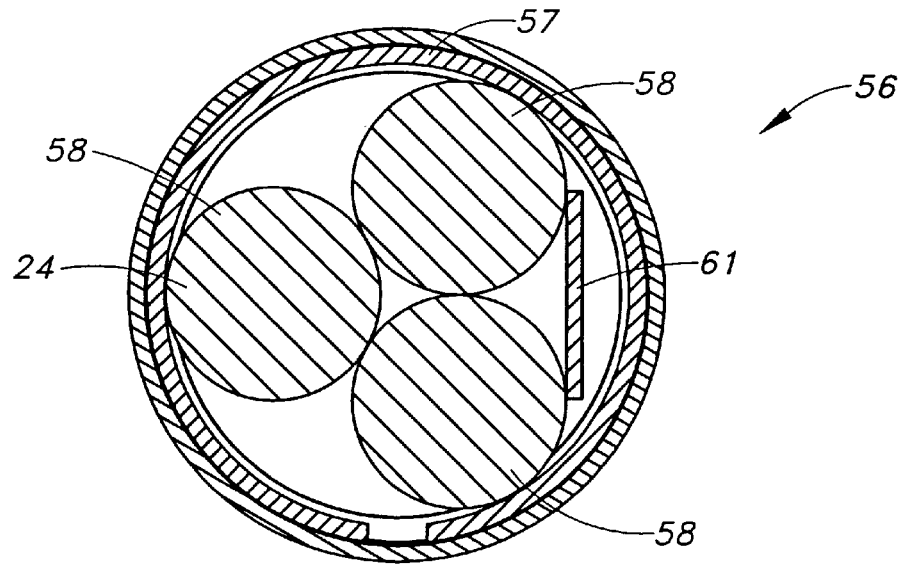
FIG._6
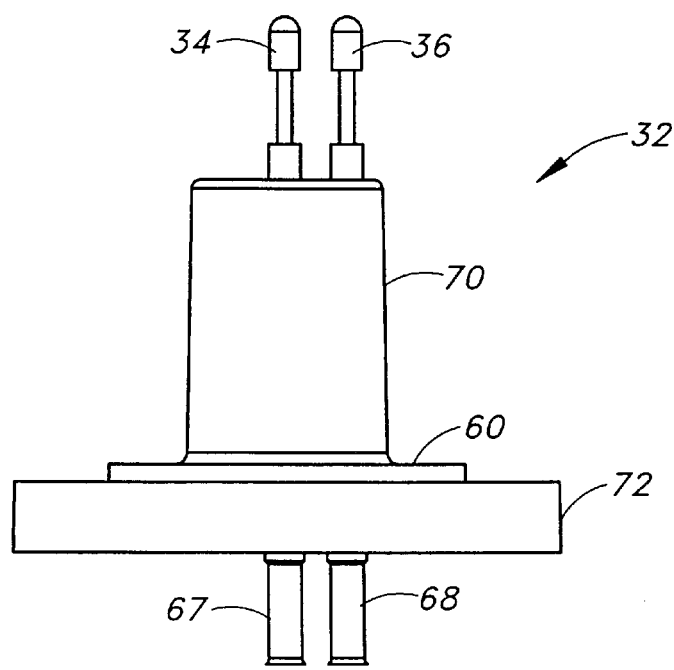
FIG._7

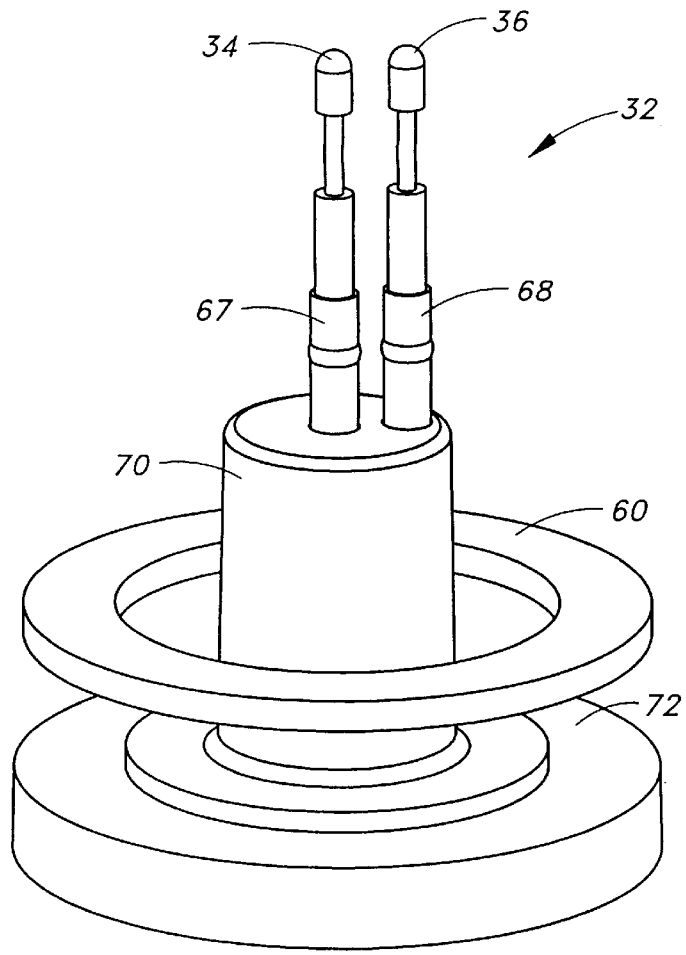
FIG._8
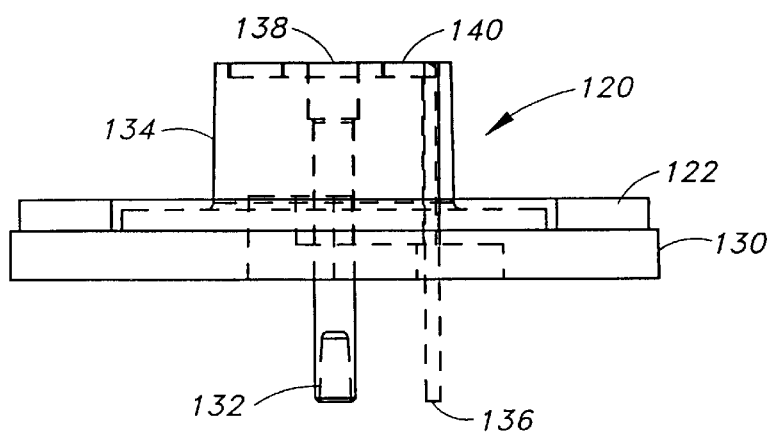
FIG._10

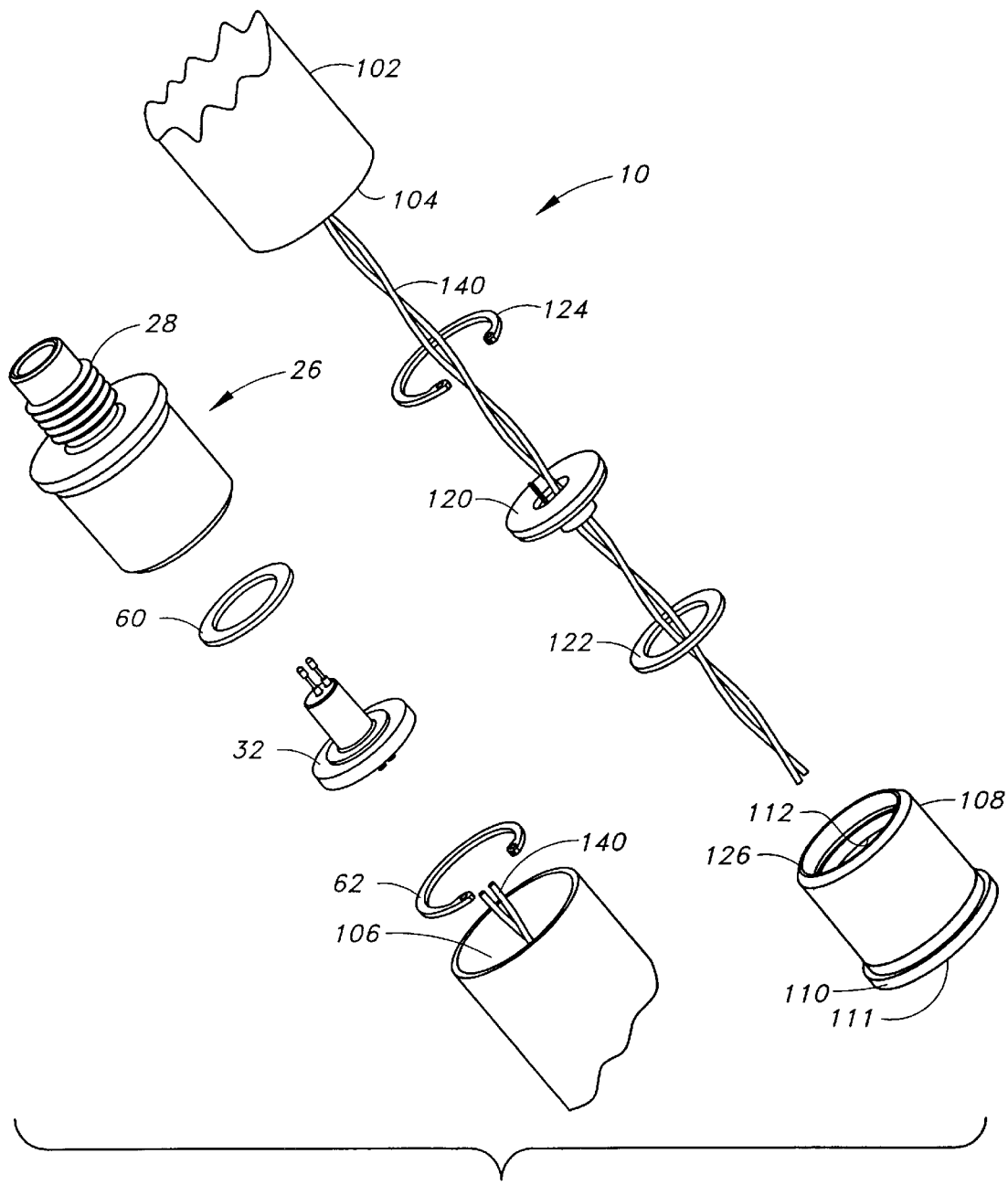
FIG._9

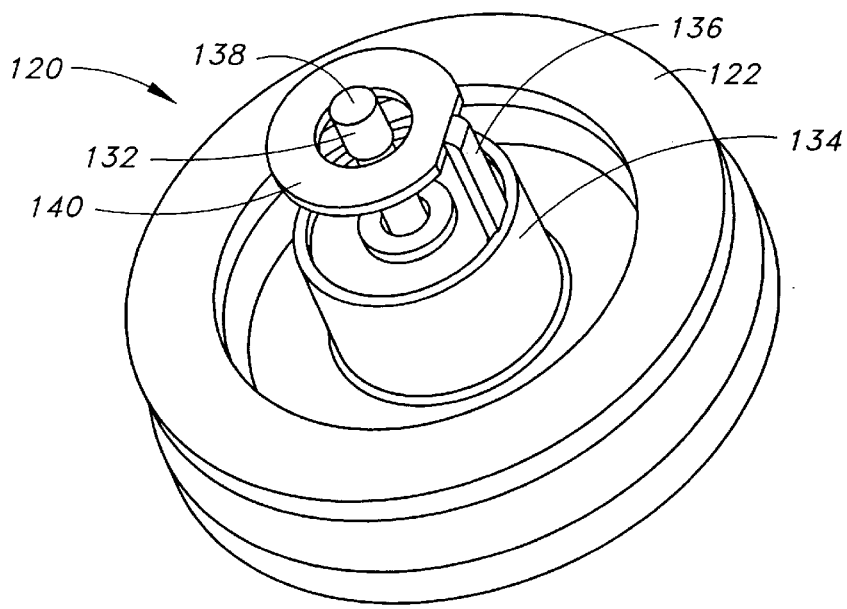
FIG._11
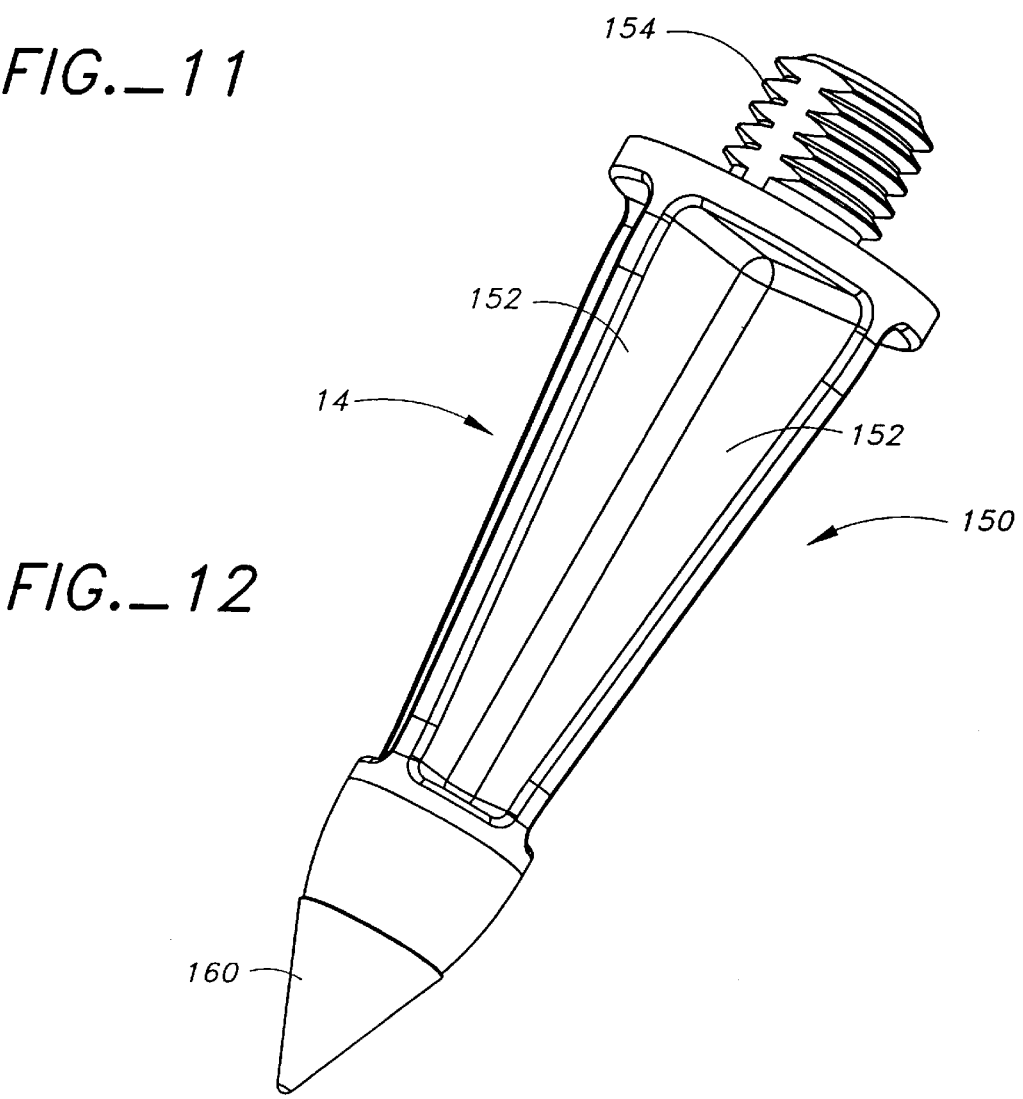
FIG._12

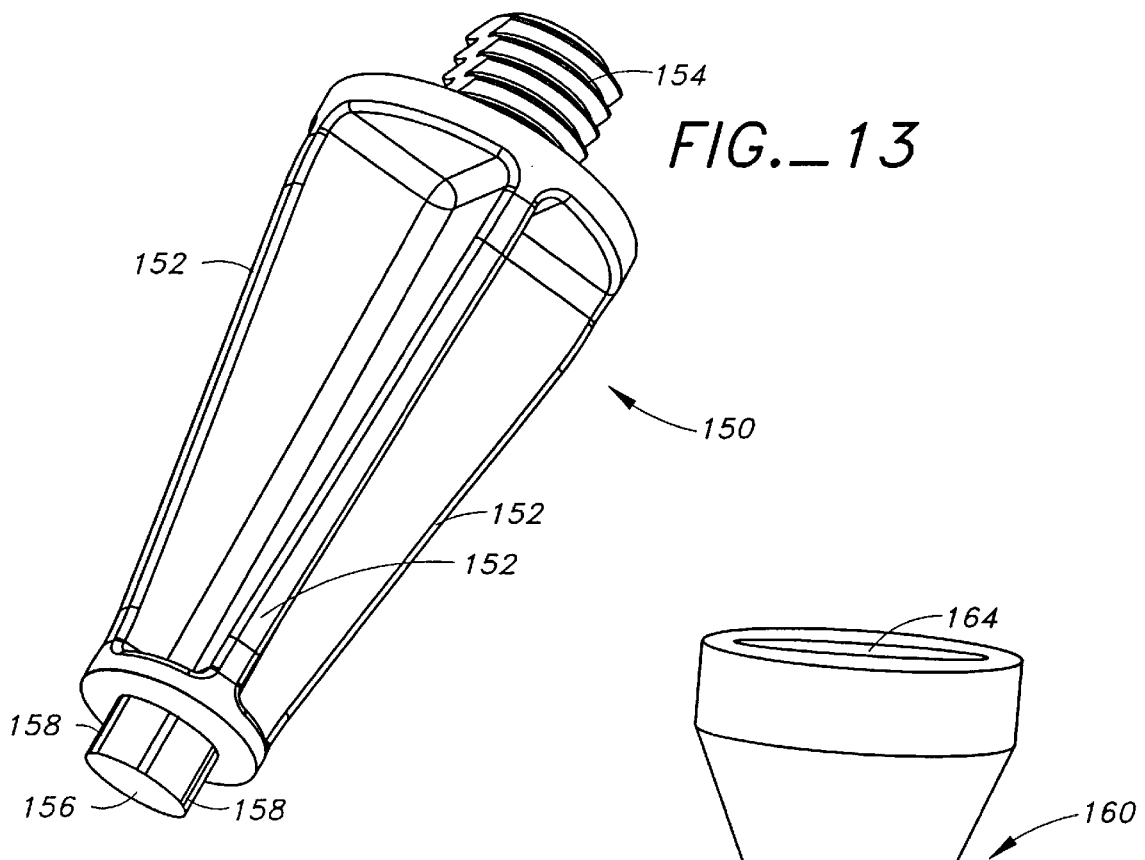
FIG._13
FIG._14
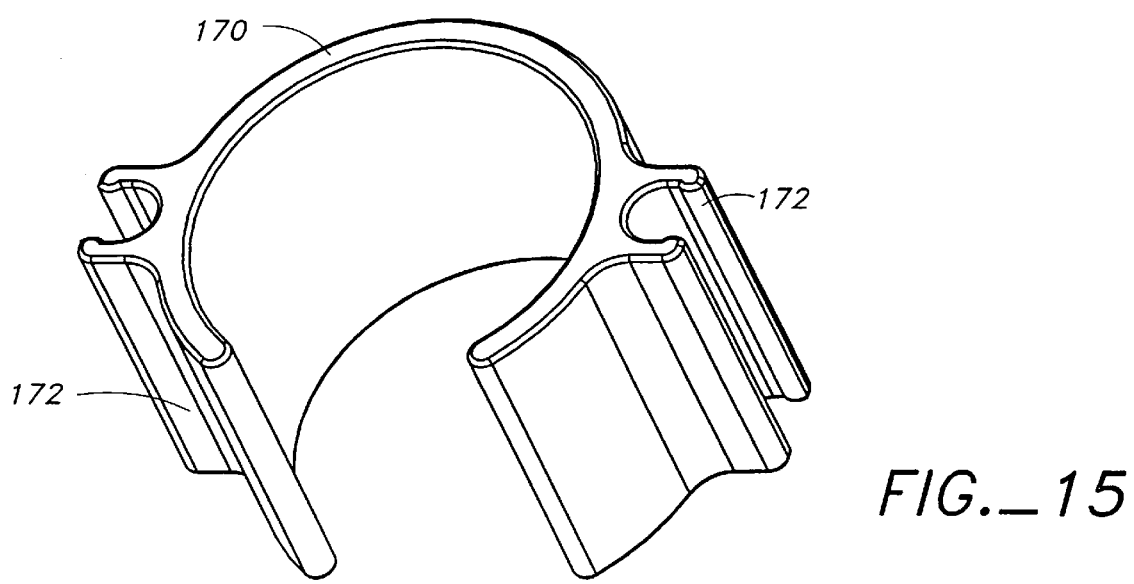
FIG._15

RANGE POLE WITH INTEGRATED POWER SYSTEM

BACKGROUND OF THE INVENTION

1. Field of the Invention

This invention is directed generally to surveying instruments and, more particularly, to a survey range pole having a detachable battery module.

2. Prior Art

A survey range pole traditionally has been made of aluminum and is carried by one member of a survey party to mark particular reference or measurement points. The range pole is visible at a distance to others in the survey party, so that distances to the range pole can be determined, or ranged. Traditionally, a range pole has a prism or target mounted at its top end.

Modern surveying systems now use global positioning systems (GPS) to determine the longitude, latitude, and altitude of points being surveyed. Previously, GPS receivers had batteries contained within the receiver housing itself or the GPS receivers were connected by wires to separate battery packs strapped to a user. For certain surveying applications, an automatic GPS antenna/receiver is mounted on the top end of a range pole and a user walks about with the range pole held in one hand. Automatically-collected data and operator-provided data are collected in a hand-held data collector unit which is sometimes conveniently mounted to a range pole. For improved accuracy, differential GPS systems use another radio receiver for receiving locally-broadcast error-correction signals. The other radio receiver for receiving the differential GPS correction signal is mounted to the top of a range pole.

The GPS receiver, the data collector, and the differential GPS receiver all operate on batteries which currently are self-contained or which are strapped to a user. A need has arisen for a light-weight range pole which can be combined with a rechargeable battery pack for use with equipment mounted on the range pole.

SUMMARY OF THE INVENTION

It is therefore an object of the invention to provide a rechargeable battery pack which is detachably connected to a lightweight range pole for operation of GPS equipment in the field.

In accordance with this and other objects of the invention, a lightweight range pole assembly and an in-line detachable battery module are provided for use, for example, with GPS equipment or other survey equipment.

A range pole assembly includes an elongated tubular range pole shell, which in one preferred embodiment is made of a graphite-epoxy composite material. The range pole has a longitudinal axis and has first and second open ends. A female cap assembly has a base portion which engages the first open end of the tubular range pole shell. The female end cap also has an internally threaded portion which extends away from the first open end of the tubular body shell. The female end cap also has a central bore formed therethrough for containing an insulator plug with electrical contacts for making external electrical connections.

A detachable battery module includes a tubular battery-module shell which in one preferred embodiment is also made of graphite-epoxy composite material. The battery-module shell also has a longitudinal axis and has first and second open ends. A male cap assembly for the battery module has a base portion which engages the first open end of the tubular range pole shell and has an externally threaded portion which extends away from the first open end of the tubular battery-module shell. A central bore is formed through the male cap assembly for containing an insulator plug with male electrical contacts mounted thereto.

A female cap assembly for the battery module has a base portion which engages the second open end of the tubular range pole shell. A battery pack is contained in the tubular body shell of the detachable battery module and which has electrical terminals which are electrically connected to respective ones of the male electrical contacts of the male end cap assembly of the detachable battery module.

The externally threaded portion of the male cap assembly of the detachable battery module engage the internally threaded portion of the female end cap at the bottom end of the range pole so that the longitudinal axis of the tubular range pole and battery-module shells are in-line and so that the male electrical contacts of the male cap assembly of the battery module engage corresponding electrical contacts of the range pole.

The range pole assembly also includes a male cap assembly having a base portion which engages the second open end of the tubular range pole shell and having an externally threaded portion which extends away from the first open end of the tubular range pole shell. The male cap assembly has a central bore formed therethrough for containing an insulator plug with male electrical contacts. Conductors are connected between respective male electrical contacts of the male cap assembly and the electrical contacts of the female cap assembly of the range pole assembly.

The female end cap of the battery module has an internally threaded portion which extends away from the second open end of the tubular body shell for attachment of a detachable range pole tip assembly. The range pole detachable tip assembly includes an aluminum tip body having external ribs formed in the sides thereof and a stainless steel tip fixed to end of the tip body.

One or more external cable clips are fixed to the elongated tubular range pole shell to provide guides for holding conductors which extend longitudinally along the range pole shell.

The male electrical contacts are spring-loaded pogo style pins and the electrical contacts of the female cap assembly are formed as concentric conductive surfaces.

The insulator plugs are respectively held in position with their respective central bores with respective retaining rings which engage corresponding grooves formed in respective end caps.

The battery pack includes a battery-pack control assembly for use with lithium-ion batteries. First and second resilient spacers are placed within the battery-module shell between the battery pack and the male and female cap assemblies. The resilient spacers are cylindrical bodies formed of resilient foamed-plastic materials. The battery module includes a layer of foamed-plastic material wrapped around the battery pack and positioned between the battery pack and an inside wall of the battery-module shell.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 1 is an overall assembly isometric view of a GPS receiver mounted to the top end of a range pole, a data collector and cable clips mounted to the range pole, a battery pack mounted near the bottom end of the range pole, and a tip mounted to the bottom end of the range pole.

FIG. 1A is a diagrammatic sectional view of a range pole and battery module prior to their being joined together.

FIG. 2 is a front elevational view of a battery pack assembly.

FIG. 3 is an enlarged top view of a battery pack assembly.

FIG. 4 is an exploded isometric view of a battery pack module assembly.

FIG. 5 is a sectional view of a battery pack assembly taken along section line 5—5 of FIG. 3.

FIG. 6 is a sectional view of a battery pack assembly taken along section line 6—6 of FIG. 2.

FIG. 7 is a front view of an insulator and male contacts assembly.

FIG. 8 is an exploded, isometric view of an insulator and male contact assembly.

FIG. 9 is an isometric, exploded view of the end sections of a range pole.

FIG. 10 is a front view of an insulator and female contact assembly.

FIG. 11 is an exploded, isometric view of an insulator and female contact assembly.

FIG. 12 is a isometric view of a range pole tip assembly.

FIG. 13 is an isometric view of a tip body element of a range pole tip assembly.

FIG. 14 is an isometric view of a tip element of a range pole tip assembly.

FIG. 15 is an isometric view of a cable holder for mounting on a range pole.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

FIG. 1 illustrates a lightweight range pole 10 connected to an in-line detachable cylindrical shaped battery module 12 by an outside portion 110. The battery module 12 is fixed to the lower end of the range pole 10. A detachable, lightweight tip assembly 14 is removably attached to the lower end of the battery module 12. A GPS antenna/receiver 16 is fixed to the top end of the range pole 10. A bracket assembly 18 adjustably positions a data collector unit 20 to the midsection of the range pole 10. External cable clips 22 (shown in FIG. 15) are positioned as required along the range pole 10 to provide guides for holding conductors (not shown) which extends longitudinally along the range pole, for example, between the data collector 20 and the antenna/receiver 16.

FIG. 1A illustrates the various components of the range pole 10, the battery module 12, and the top 14, as described herein below, prior to their being screwed together.

FIG. 2. illustrates an exploded view of a detachable cylindrical shaped battery pack module 12. A tubular shell body 24 having a center axis is preferably formed of graphite-epoxy composite material. A male cap 26 formed of metal, preferably aluminum, engages one end of the shell 24. An externally threaded stud portion 28 of the male cap 26 extends axially away from the tubular shell 24.

FIG. 3 is an enlarged top view of the battery module illustrating that the externally threaded portion 28 of the male cap 26 has a central bore 30 formed therethrough for containing an insulator plug 32 which has male electrical contact pins 34, 36 mounted thereto.

Referring again to FIG. 2, a female cap assembly 40 formed of metal, preferably aluminum, engages the other end of the shell 24. As illustrated herein below in FIG. 5, the lower external end 42 of the female end cap 40 has internal threads formed therein.

FIG. 4 is an exploded, isometric view of the battery pack module assembly 12 which shows the male cap 26 having a sleeve portion 46 which engages one open end of the tubular range pole shell 24. The female end cap 40 also has a sleeve portion 48 which engages the other open end of the tubular range pole shell 24. The sleeve portions 46, 48 of the respective end caps are fixed in place in the shell 12 using an appropriate commercially available adhesive material.

A pair of resilient spacers 50, 52, are shaped as split cylindrical bodies and are formed of resilient foamed-plastic materials. They are respectively placed within the battery-module shell 24 between one end of a battery pack 56 and the male cap 26 and between the other end of the battery pack 56 and the female cap 40. The battery pack 56 includes, for example 6 cylindrical batteries 58.

A layer 57 of foamed-plastic resilient material is wrapped around the battery pack 56 and positioned between the battery pack 56 and an inside wall of the battery-module shell 24.

The insulator plug 32 with its male electrical contact pins 34, 36 (shown in FIG. 3) is mounted inside the male end cap 26. A gasket washer 60 seals the male end cap. A split retaining ring 62 holds the insulator plug 32 in position. A pair of wires provide connections between the terminals of the batteries 58 and the male electrical contact pins 34, 36.

FIG. 5 is a sectional view of a battery pack assembly 12 showing the male end cap 26 and the female end cap 40 engaging opposite ends of the tubular shell 24. The male cap assembly 26 includes the externally threaded stud 28 having the central bore 30 axially formed therein and containing a portion of the insulator plug 32. A larger axial bore 66 is also formed in the male end cap, as illustrated.

The insulator plug 32 has pin sockets 67, 68 extending therethrough. The pin sockets 67, 68 contain spring-loaded male pogo pin style electrical contacts 34, 36. The female end cap assembly 40 has an internally threaded portion 69 which extends away from the tubular battery-module shell 24 as shown.

FIGS. 5 and FIG. 6 in cross-section illustrate the battery pack 56 which is formed, for example, of six cylindrical lithium-ion cells 58 and a control printed-circuit board 61. Contacts (not shown) on the batteries are connected to the pin sockets 67, 68 with wires 64.

FIGS. 7 and 8 illustrate the insulator plug 32 with pin sockets 67, 68 extending therethrough. The pin sockets 67, 68 contain spring-loaded male pogo pin electrical contacts 34, 36. The insulator plug 32 includes a plug body portion 70 which fits within the bore 30. The insulator plug 32 also includes an attached outwardly extending flange portion 72 which fits within the bore 66 in the male end cap 26. A water sealing gasket 60 fits next to the upper surface of the flange portion 72.

With reference to FIG. 5, the flanged portion 72 is shown fitting within the bore 66 in the male cap assembly 26. The water sealing gasket 60 fits between the flange portion 72 and the top surface of the bore 66. The insulator plug 32 is held in place with the retaining ring 62 which engages a groove 78 formed in the end cap 26 adjacent to the bore 66.

FIG. 9 shows an exploded view of the end sections of a range pole assembly 10 of FIG. 1. An elongated composite graphite-epoxy tube provides a light, but strong, range pole shell 102, which has a first open end 104 and a second open end 106. A female cap 108 at the lower end of the shell 102 engages the first open end 104 of the tubular range pole shell. The female cap assembly 108 has internal threads 111 and an outside portion 110. This is similar to the female end cap 40 for the battery module 12 shown in FIG. 4. The female cap 108 includes a central bore 112 formed therethrough for containing an insulator plug and contact assembly 120. The insulator plug assembly 120 and a gasket washer 122 are held in position with a split retaining ring 124 which engages a groove 126 formed in the female end cap 108.

FIGS. 10 and 11 illustrate the insulator plug 120 with a center pin 132 extending through a cylindrical plug body portion 134 thereof. Another offset pin 136 also extends through the edge. They portion 134 near its outside edge. The cylindrical plug body portion 134 fits within the central bore 112 formed through the female cap 108 of FIG. 9. The water sealing gasket washer 122 fits next to a flange portion 130 of the cylindrical plug body portion 134. The top surface of the plug 134 has a first contact surface 138 at the end of the center pin 132 and a surrounding second concentric contact surface 140 connected to the offset pin 136.

Referring back to FIG. 9, the male cap assembly 32 has the same structural features as the male cap assembly for the battery module 12 of FIG. 4, where the same reference numerals are used to denote like elements. The range pole assembly includes a pair 140 of wire conductors connected between respective male electrical contacts of the male cap assembly and the female electrical contacts of the female cap assembly of the range pole assembly 10.

FIG. 12 is a isometric view of a range pole detachable tip assembly 14 having an axis aligned with the longitudinal axis of the range pole shell. The tip assembly includes a ribbed aluminum tip body 150 having external ribs 152 formed in the sides thereof with the body tapering thereof from one larger end to another smaller end. The ribs are what remain in the design of the tip body 150 after reduction of the weight of the tip body 150 to thereby reduce the weight of the tip assembly. A threaded stud 154 extends from the larger end of the ribbed aluminum tip body 150.

FIG. 13 shows the threaded stud 154 extending from the larger end of the ribbed aluminum tip body 150 for engagement with the internally threaded portion of the female cap assembly of the battery module 12. The smaller end of the ribbed aluminum tip body 150 has a cylindrical stud 156 with vertical ribs 158.

FIG. 14 shows a stainless steel tip 160 having a point 162 at one end thereof and having another larger end with a cylindrical cavity 164 formed therein. The stainless steel tip 160 is press fit onto the cylindrical stud 156 at the smaller end of the ribbed aluminum tip body 150.

FIG. 15 shows an external conductor clip 170 which is formed as a segment of ring of a molded plastic material and which is adapted to being fixed to the elongated tubular range pole 10. The clip 170 has a pair of opposing longitudinally extending raised grooved strips 172 formed on the clip providing guides for holding conductors which extends longitudinally along the range pole 10, for example, between the data collector and the GPS antenna/receiver 16 of FIG. 1.

FIG. 1A schematically illustrates assembly of the battery module 12 to the range pole 10. The male cap assembly 26 is threadably joined to the female cap assembly 108 to cause the pin contacts 34, 36 to become engaged to the coaxial contacts 138, 140. The tip assembly 14 is threadably attached to the female end cap 40 of the battery module. The male cap assembly 26 at the top end of the range pole 10 is adapted to connect to other equipment such as a GPS receiver 16 of FIG. 1.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular us contemplated. It is intended that the scope of the invention be defined by the Claims appended hereto and their equivalents.

We claim:

1. A range pole and in-line detachable battery module assembly, comprising:

a range pole assembly, including:

an elongated tubular range pole shell having a longitudinal axis and having first open end and a second open end;

a female cap assembly having a base portion which engages the first open end of the tubular range pole shell and having an internally threaded portion which extends away from the first open end of the tubular body shell and which has a central bore formed therethrough for containing an insulator plug with electrical contacts;

a detachable battery module, including:

a tubular battery-module shell having a longitudinal axis and having a first open end and a second open end;

a female cap assembly having a base portion which engages the second open end of the tubular range pole shell;

a male cap assembly having a battery pack which is contained in the tubular body shell of the detachable battery module and which has electrical terminals which are electrically connected to respective ones of the male electrical contacts of the male end cap assembly of the detachable battery module; and wherein the externally threaded portion of the male cap assembly of the detachable battery module engage the internally threaded portion of the range pole so that the longitudinal axis of the tubular range pole assembly and battery-module shells are in-line and so that the male electrical contacts of the male cap assembly of the battery module engage corresponding electrical contacts of the range pole.

2. The range pole and in-line detachable battery module assembly of claim 1, wherein the range pole assembly includes:

a male cap assembly having a base portion which engages the second open end of the tubular range pole shell and having an externally threaded portion which extends away from the first open end of the tubular range pole shell, the male cap assembly having a central bore formed therethrough for containing an insulator plug with male electrical contacts; and conductors connected between respective male electrical contacts of the male cap assembly and the female electrical contacts of the female cap assembly of the range pole assembly.

3. The range pole and in-line detachable battery module assembly of claim 1, including;

the female cap assembly of the battery module having an internally threaded portion which extends away from the second open end of the tubular body shell;

a range pole detachable tip assembly having an axis aligned with the longitudinal axis of the range pole shell, including:

a tip body having external ribs formed in the sides thereof, the body tapering along the axis from one larger end to another smaller end and having a threaded stud extending from the larger end for engagement with the internally threaded portion of the female cap assembly, and a tip having a point at one end thereof and having another larger end fixed to the smaller end of the tip body.

4. The range pole and in-line detachable battery module assembly of claim 1, including an external conductor clip fixed to the elongated tubular range pole shell and providing guides for holding a conductor which extends longitudinally along the range pole shell.

5. The range pole and in-line detachable battery module assembly of claim 1, wherein the range pole and battery-module shells are formed with a graphite-epoxy material.

6. The range pole and in-line detachable battery module assembly of claim 3, wherein the tip body is formed from an aluminum material.

7. The range pole and in-line detachable battery module assembly of claim 3, wherein the tip is formed of a stainless steel material.

8. The range pole and in-line detachable battery module assembly of claim 1, wherein the male electrical contacts are spring-loaded pins.

9. The range pole and in-line detachable battery module assembly of claim 1, wherein the electrical contacts of the female cap assembly are formed as concentric conductive surfaces.

10. The range pole and in-line detachable battery module assembly of claim 1, wherein the insulator plugs are respectively held in position with their respective central bores with respective retaining rings which engage corresponding grooves formed in respective end caps.

11. A range pole and in-line detachable battery module assembly, comprising:

a range pole assembly, including:

an elongated tubular graphite-epoxy range pole shell having a first open end and a second open end;

a female cap assembly including a base portion which engages the first open end of the tubular range pole shell and which has an internally threaded portion which extends away from the first open end of the tubular body shell;

wherein the female cap assembly includes a central bore formed therethrough for containing an insulator plug to which are attached coaxial electrical contacts and wherein the coaxial electrical contacts include a first contact surface surrounded by a second concentric contact surface;

a male cap assembly including base portion which engages the second open end of the tubular range pole shell and which has an externally threaded portion which extends away from the first open end of the tubular body shell;

wherein the male cap assembly includes a threaded stud having a central bore formed therethrough for containing an insulator plug to which are attached pin sockets which contain spring-loaded male pin electrical contacts;

wherein the range pole assembly includes conductors connected between respective male electrical contacts of the male cap assembly and the female electrical contacts of the female cap assembly of the range pole assembly;

a detachable battery module, including:

a tubular battery-module shell having a first open end and a second open end;

a male cap assembly including a base portion which engages the first open end of the tubular battery shell and having an externally threaded portion which extends away from the first open end of the tubular battery-module shell;

wherein the male cap assembly includes a threaded stud having a central bore formed therein and containing an insulator plug to which are attached sockets which contain spring-loaded male pin electrical contacts;

a female cap assembly having a base portion which engages the first open end of the tubular range pole shell;

a battery pack which is contained in the tubular body shell of the detachable battery module and which has electrical terminals which are electrically connected to respective ones of the male electrical contacts of the male end cap assembly of the detachable battery module; and wherein the externally threaded portion of the male cap assembly of the detachable battery module engage the internally threaded portion of the range pole so that the spring-loaded male pin electrical contacts of the male cap assembly of the battery module correspondingly engage the first contact surface and the surrounding second concentric contact surface.

12. The range pole and in-line detachable battery module assembly of claim 11, including:

the female cap assembly of the battery module having an internally threaded portion which extends away from the second open end of the tubular body shell;

a range pole detachable tip assembly having an axis aligned with the longitudinal axis of the range pole shell, including:

a ribbed aluminum tip body having external ribs formed in the sides thereof, the body tapering from one larger end to another smaller end and having a threaded stud extending from the larger end for engagement with the internally threaded portion of the female cap assembly, and a stainless steel tip having a point at one end thereof and having another larger end fixed to the smaller end of the tip body wherein the tip body and tip form the tip assembly.

13. The range pole and in-line detachable battery module assembly of claim 11, wherein the insulator plugs are respectively held in position with their respective central bores with respective retaining rings which engage corresponding grooves formed in respective end caps.

14. The range pole and in-line detachable battery module assembly of claim 11, wherein the detachable battery module includes:

the battery pack including a battery-pack control assembly;

a first resilient spacer placed within the battery-module shell between the battery pack and the male cap assembly;

a second resilient spacer placed within the battery-module shell between the battery pack and the female male cap assembly.

15. The range pole and in-line detachable battery module assembly of claim 11, wherein the first and second resilient spacers are cylindrical bodies formed of resilient foamed-plastic materials.

16. The range pole and in-line detachable battery module assembly of claim 11, wherein the battery module includes a layer of foamed-plastic material wrapped around the battery pack and positioned between the battery pack and an inside wall of the battery-module shell.

17. The range pole and in-line detachable battery module assembly of claim 11, including at least one external cable clip fixed to the elongated tubular range pole shell and providing guides for holding conductor which extend longitudinally along the range pole shell.

18. A range pole rod assembly comprising:

a tubular body shell having a first open end and a second open end;

a male cap assembly, including:

a metal male end cap having a first sleeved end which engages the first open end of the tubular body shell and having an opposite second end which has external threads formed thereupon, said metal male end cap having a bore extending therethrough;

a male insulated electrical contacts assembly contained in the bore extending through the metal end cap and including:

an electrically insulated member contained within the bore of the metal male end cap;

two or more pin sockets which extend through the electrically insulated member;

spring-loaded pins respectively contained by the pin sockets and extending through the second end of the end cap opposite the tubular body shell;

a female end cap assembly, including:

a metal female end cap having a first sleeved end which engages the second end of the tubular body shell and having an opposite second end which has internal threads formed therein, sale metal female end cap having a bore extending therethrough;

a female insulated electrical contacts assembly contained in the bore extending through the metal female end cap and including:

an electrically insulated member contained within the bore of the metal female end cap;

two or more electrical contact areas located on the electrically insulated member and adapted for engagement with respective spring-loaded pins;

two or more contact pins extending through the electrically insulated member and connected to respective ones of the two or more electrical contact areas; and conductors connected between respective male electrical contacts of the male cap assembly and the female electrical contacts of the female cap assembly of the range pole assembly.

19. A detachable battery module for a range pole, comprising:

a tubular battery-module shell having a first open end and a second open end;

a male cap assembly including a base portion which engages the first open end of the tubular battery shell and which has an externally threaded portion which extends away from the first open end of the tubular battery-module shell;

wherein the male cap assembly includes a threaded stud having a central bore formed therein and containing an insulator plug to which are attached pin sockets which contain spring-loaded male pin electrical contacts;

a female cap assembly including a base portion which engages the second open end of the tubular battery shell and which has an internally threaded portion which extends away from the first open end of the tubular battery-module shell;

a battery pack which is contained in the tubular body shell of the detachable battery module and which has electrical terminals which are electrically connected to respective ones of the male electrical contacts of the male end cap assembly of the detachable battery module; and wherein the externally threaded portion of the male cap assembly of the detachable battery module is adapted to engage an internally threaded portion of a range pole or electronic module so that the spring-loaded pin electrical contacts of the male cap assembly of the battery module are adapted to engage correspondingly contact surfaces in the range pole or electronic module.

20. The range pole and in-line detachable battery module assembly of claim 19, wherein the detachable battery module includes:

the battery pack including a battery-pack control assembly;

a first resilient spacer placed within the battery-module shell between the battery pack and the male cap assembly; and a second resilient spacer placed within the battery-module shell between the battery pack and the female male cap assembly.

21. The range pole and in-line detachable battery module assembly of claim 19, wherein the first and second resilient spacers are cylindrical bodies formed of resilient foamed-plastic materials.

22. The range pole and in-line detachable battery module assembly of claim 19, wherein the battery module includes a layer of foamed-plastic material wrapped around the battery pack and positioned between the battery pack and an inside wall of the battery-module shell.

* * * * *